United States Patent
Jensen (10) Patent No.: US 11,329,481 B2
(45) Date of Patent: May 10, 2022

(54) CURRENT LIMITING CIRCUIT ARRANGEMENT

(71) Applicant: Littelfuse, Inc., Chicago, IL (US)

(72) Inventor: Kristophor Ray Jensen, Chicago, IL (US)

(73) Assignee: Littelfuse, Inc., Chicago, IL (US)

(*) Notice: Subject to any disclaimer, the term of this patent is extended or adjusted under 35 U.S.C. 154(b) by 108 days.

(21) Appl. No.: 16/876,692

(22) Filed: May 18, 2020

(65) Prior Publication Data

US 2021/0359510 A1    Nov. 18, 2021

(51) Int. Cl.
*H02H 9/02* (2006.01)
*H02H 1/00* (2006.01)

(52) U.S. Cl.
CPC .......... *H02H 9/025* (2013.01); *H02H 1/0007* (2013.01)

(58) Field of Classification Search
CPC .......... H02H 1/00; H02H 1/0007; H02H 3/00; H02H 3/02; H02H 9/002; H02H 9/02; H02H 9/025
See application file for complete search history.

(56) References Cited

U.S. PATENT DOCUMENTS

| | | | |
|---|---|---|---|
| 3,388,316 A * | 6/1968 | Gately | G05F 1/573 323/277 |
| 3,603,811 A | 9/1971 | Day | |
| 4,533,970 A | 8/1985 | Brown | |
| 4,891,728 A | 1/1990 | Preis et al. | |
| 5,089,767 A | 2/1992 | Neidorff | |
| 5,196,980 A | 3/1993 | Carson | |
| 5,272,399 A | 12/1993 | Tihanyi et al. | |
| 5,742,463 A | 4/1998 | Harris | |
| 6,225,797 B1 | 5/2001 | Willis et al. | |
| 6,373,104 B1 | 4/2002 | Smith | |
| 6,831,447 B1 | 12/2004 | Wittenberg | |
| 6,970,337 B2 | 11/2005 | Strahm | |

(Continued)

FOREIGN PATENT DOCUMENTS

| EP | 0684677 A1 | 8/1994 |
|---|---|---|
| EP | 1087441 A2 | 3/2001 |

*Primary Examiner* — Jared Fureman
*Assistant Examiner* — Nicolas Bellido
(74) *Attorney, Agent, or Firm* — KDB Firm PLLC (57) ABSTRACT

A floating two-terminal unipolar current limiting circuit arrangement implemented with enhancement mode devices and bipolar devices with a unique voltage-current operation curve. This operation curve makes this device particularly advantageous to instrumentation systems that are intended to experience large voltage transients and long-term exposure to voltages that would normally damage measurement equipment. The present current limiting device is designed to have a large impedance value prior to a "turn-on" voltage, then quickly transitions to a low-impedance state. When the conducted current exceeds a setpoint or a high-voltage event occurs, the current limiting device further transitions to the "cutoff" region, which transition resumes the initial high-impedance state. In one embodiment the threshold current may be set with internal components, while a further embodiment allows the current setpoint to be set by external components. The current limiting device designs according to the present embodiments allow for series scaling and parallel scaling.

15 Claims, 8 Drawing Sheets

(56) References Cited

U.S. PATENT DOCUMENTS

| | | | |
|---|---|---|---|
| 8,320,090 B2* | 11/2012 | Rozman | H02H 1/0015 |
| | | | 361/42 |
| 10,075,062 B2 | 9/2018 | Ferguson | |
| 10,218,171 B2 | 2/2019 | Zhu et al. | |
| 2004/0264090 A1 | 12/2004 | Strahm | |
| 2014/0009134 A1* | 1/2014 | Bernardon | H02J 7/0029 |
| | | | 323/284 |
| 2018/0159317 A1* | 6/2018 | Mirabella | G05F 1/56 |
| 2019/0207375 A1* | 7/2019 | Telefus | H02H 1/06 |
| 2020/0106260 A1* | 4/2020 | Telefus | H03K 17/687 |

\* cited by examiner

CURRENT LIMITING CIRCUIT ARRANGEMENT

FIELD

Embodiments relate to the field of protection devices, an in particular, to current-limiting circuits.

BACKGROUND

Current-limiting circuits are known for protecting various equipment and devices. In some applications, such as the protection of instrumentation systems, large voltage transients take place during normal operation, as well as long-term exposure to high voltage levels. With respect to these and other considerations, the present embodiments are provided.

BRIEF SUMMARY

One embodiment of the present disclosure may be implemented as a device that includes enhancement mode devices (field effect transistors) and bipolar transistor devices, generating a novel voltage-current operation curve. This operation curve makes this device particularly advantageous for protecting instrumentation systems that are intended to experience large voltage transients and long-term exposure to voltages that would normally damage measurement equipment. The current limiting devices of the present embodiments are designed to have a large impedance value prior to a "turn-on" voltage, while quickly transitioning to a low-impedance. When the conducted current exceeds a setpoint or a high-voltage event occurs, the current limiting device further transitions to a "cutoff" region, which transition resumes the initial high-impedance state. In a further embodiment the threshold current may be set using internal components, while a further embodiment allows the current setpoint to be set by external components. The current limiting devices has of the present disclosure may also be designed to allow for series scaling and parallel scaling. The present embodiments have applications for measurement systems as a protected signal measurement path. Further applications of embodiment of the present disclosure include use as an active current limiter for low-power line-connected power supplies. In further embodiments, the present embodiments may be used in combination with overvoltage protection devices to create more comprehensive electronic network protection systems.

DESCRIPTION OF EMBODIMENTS

The present embodiments will now be described more fully hereinafter with reference to the accompanying drawings, in which exemplary embodiments are shown. The embodiments are not to be construed as limited to the embodiments set forth herein. Rather, these embodiments are provided so that this disclosure will be thorough and complete, and will fully convey their scope to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate that two or more elements are in direct physical contact with one another. Also, the term "on,", "overlying," "disposed on," and "over", may mean that two or more elements are not in direct contact with one another. For example, "over" may mean that one element is above another element while not contacting one another and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In various embodiments, systems and devices are included for providing current limiting protection. Embodiments of the present disclosure provide protection apparatus and techniques that are designed to harness three primary control laws: normally-on operation; current limiting operation; and over voltage foldback operation.

One embodiment of the present disclosure may be implemented as a device that includes enhancement mode devices (field effect transistors) and bipolar transistor devices, generating a novel voltage-current operation curve. This operation curve makes this device particularly advantageous for protecting instrumentation systems that are intended to experience large voltage transients and long-term exposure to voltages that would normally damage measurement equipment. The current limiting devices of the present embodiments are designed to have a large impedance value prior to a "turn-on" voltage, while quickly transitioning to a low-impedance. When the conducted current exceeds a setpoint or a high-voltage event occurs, the current limiting device further transitions to a "cutoff" region, which transition resumes the initial high-impedance state.

In a further embodiment the threshold current may be set using internal components, while an additional embodiment allows the current setpoint to be set by external components. The current limiting devices of the present disclosure may also be designed to allow for series scaling and parallel scaling. The present embodiments have applications for measurement systems as a protected signal measurement path. Further applications of embodiment of the present disclosure include use as an active current limiter for low-power line-connected power supplies. In further embodiments, the present embodiments may be used in combination with overvoltage protection devices to create more comprehensive electronic network protection systems.

A listing of various components for the instant figures is detailed in Table I.

| Item | Description |
|------|-------------|
| 100 | Embodiment of present disclosure |
| 110 | Another embodiment of present disclosure |
| 200 | Detailed diagram of various embodiments |
| 201 | First terminal |
| 202 | Second terminal |
| 203 | Primary current path transistor |
| 204 | Voltage sense control loop transistor |
| 205 | Weak Normally-On and Current Sense control loop transistor |
| 206 | Resistor |
| 207 | Capacitor |
| 208 | Resistor |
| 209 | Capacitor |
| 210 | Breakdown diode |
| 211 | Resistor |
| 212 | Resistor |
| 213 | Diode |
| 214 | Capacitor |
| 215 | Resistor |
| 216 | Resistor |
| 217 | High-Voltage Diode |
| 218 | Resistor |
| 220 | Schematic symbol for one embodiment of the present embodiments |
| 230 | Schematic symbol for a further embodiment |
| 300 | Detailed diagram of various embodiments |
| 301 | First terminal |
| 302 | Second terminal |
| 303 | Primary current path transistor |
| 304 | Voltage sense control loop transistor |
| 305 | Weak Normally-On and Current Sense control loop transistor |
| 306 | Resistor |
| 307 | Capacitor |
| 308 | Resistor |
| 309 | Capacitor |
| 310 | Breakdown diode |
| 311 | Resistor |
| 312 | Resistor |
| 313 | Diode |
| 314 | Capacitor |
| 315 | Resistor |
| 316 | Resistor |
| 317 | High-Voltage Diode |
| 318 | Resistor |
| 800 | Exemplary depiction of the voltage-current operation for present embodiment |
| 900 | Exemplary depiction of the power dissipation and ohmic performance of the present embodiments |

Figure 1:
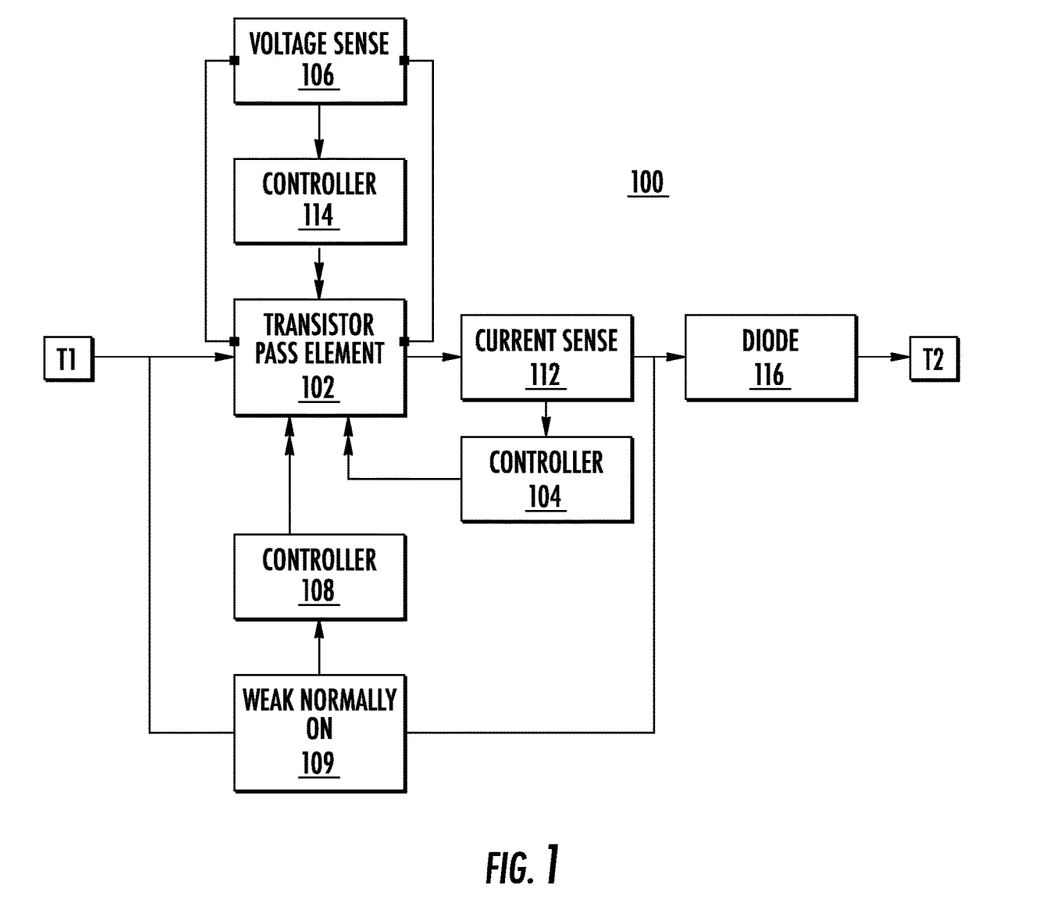
FIG. 1 presents a depiction of first embodiment of present disclosure.

Turning now to FIG. 1, there is shown a current-limiting circuit 100, arranged in accordance with embodiments of the disclosure. The current-limiting circuit 100 may include a first terminal T1, a second terminal T2, a transistor pass element 102, directly coupled to the first terminal T1, a current sense element 112, coupled in electrical series between the first terminal T1 and the second terminal T2, a first controller 104, coupled between the current sense element 112 and the transistor pass element 102, a diode 116, coupled in electrical series between the current sense element 112 and the second terminal T2, a weak normally on circuit 109, as well as a second controller 108, coupled to the transistor pass element 102; and a voltage sense element 106 and third controller 114, coupled between the voltage sense element 106 and the transistor pass element 102. In some embodiments, the second terminal T2 may be connected to an input of an external device, such as a general-purpose data acquisition device, control device, protection relay, power supply, electrical load, or lab instrument.

According to different embodiments of the disclosure, the transistor pass element 102 may be a bipolar junction transistor (BJT), metal oxide semiconductor field effect transistor (MOSFET), silicon carbide FET (SICFET), insulated gate bipolar transistor (IGBT) or a plurality of transistors, arranged in a cascode arrangement, for example. As detailed in the embodiments to follow, the transistor pass element is to be controlled at its gate or base terminal in common with its source or emitter terminal.

Figure 2:
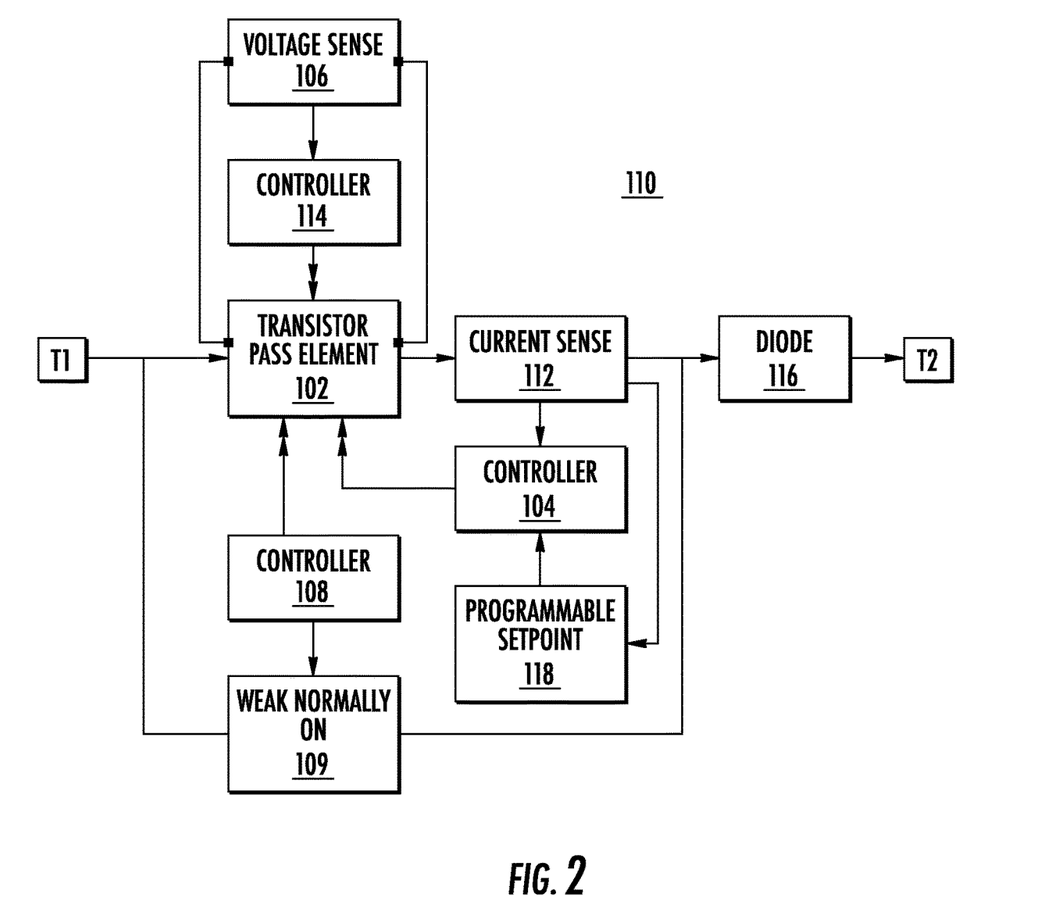
FIG. 2 presents a depiction of a further embodiment.

Turning now to FIG. 2, there is shown a current-limiting circuit 110, arranged in accordance with additional embodiments of the disclosure. The current-limiting circuit 110 may include generally the same components as in current-limiting circuit 100, arranged in a similar configuration, with like components labeled the same. In addition, the current-limiting circuit 110 may include a programmable setpoint component 118, coupled between the current sense element 112 and the first controller 104.

During normally-on operation of the current-limiting circuit 110 or current-limiting circuit 100, the control terminal of the pass transistor (such as gate in MOSFET or base in bipolar device) is biased to normally-on by a highly resistive network, composed of weak normally on circuit 109, as well as a second controller 108, and having appropriate ratios that will allow the transistor pass element 102 to conduct current in the direction from terminal T1 to T2. This normally-on operation mechanism provides a means to control a normally-off transistor in coordination with the two further control laws or principles. In accordance with various embodiments, the highly-resistive normally-on control circuit (108, 109) may minimally include various resistive elements, as detailed with respect to the figures to follow below.

In accordance with various embodiments, a current-limit control circuit may include the current sense element 112 and first controller 104, and in particular embodiments may be minimally constructed of a current sense resistor, and a first control transistor, and a connection to a pass transistor control terminal, such as in the transistor pass element 102.

According to embodiments of the disclosure, the current-limiting circuit 100 and current-limiting circuit 110 are arranged such that, as the magnitude of current increases through the current sense element 112, a resulting voltage will control the first controller 104, which controller in-turn controls the transistor pass element 102. The first control transistor will gradually control the transistor pass element 102 to become more resistive, thus limiting current through the current sense element 112.

Additionally, and in accordance with various embodiments of the disclosure, the current-limiting circuit 100 and current-limiting circuit 110 are arranged such that, as the voltage across the transistor pass element 102 increases due to current limiting, the aforementioned third control law or begins to dominate the transistor pass element 102. An overvoltage control circuit composed of the voltage sense element 106 and third controller 114 may be formed of a voltage divider sensing element and a second control transistor, as detailed below. In operation, the second control transistor can completely turn off the transistor pass element 102 when the voltage across the second control transistor reaches a level set by the voltage divider sensing element. In different embodiments, additionally circuitry may be added to modify the control behavior for dynamic response requirements. Notably, the overvoltage control circuit (106, 114) is active just while the terminals T1 and T2 are forward biased, where T1 has greater voltage potential than T2.

In the event of a reverse bias condition, the diode 116 is selected to protect the transistor pass element 102 and control circuitry.

Figure 3:
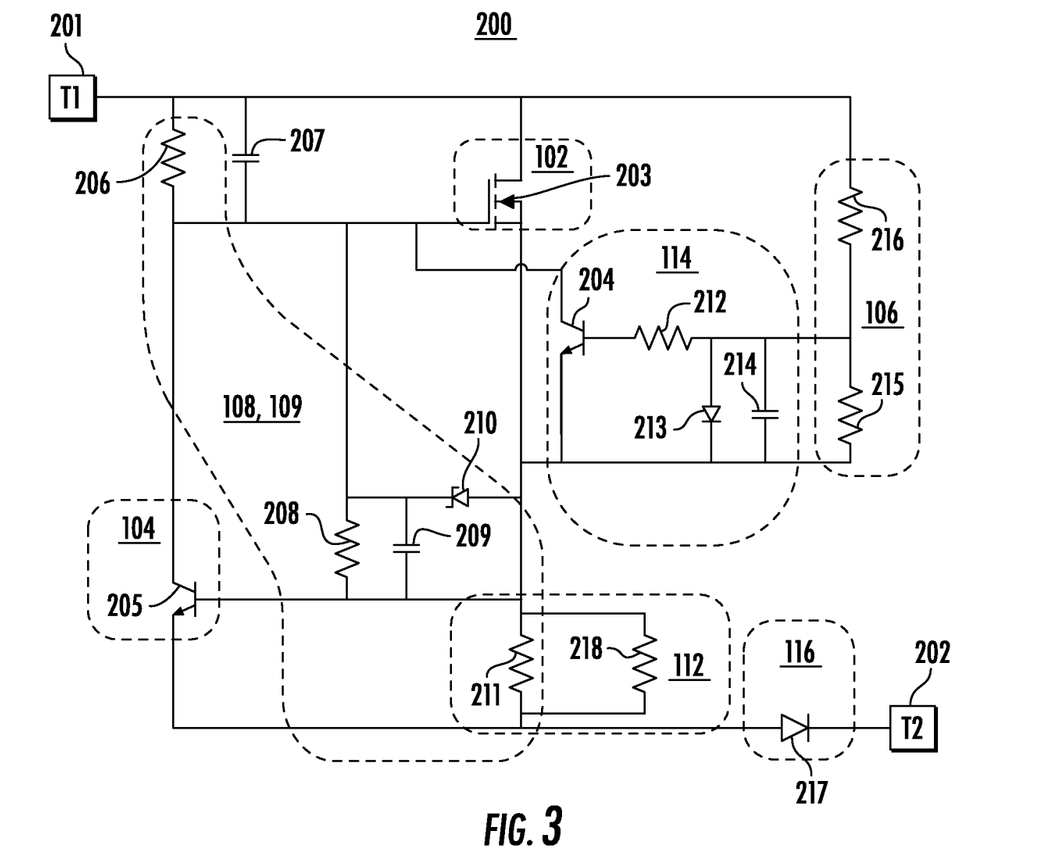
FIG. 3 presents a schematic drawing of various embodiments.

Turning now to FIG. 3, there is shown a current-limiting circuit 200, arranged in accordance with additional embodiments of the disclosure. The current-limiting circuit 200 may include generally circuit elements that perform the functions of the components of current-limiting circuit 100, arranged in a similar configuration, where the elements of FIG. 1 are shown in dashed lines. As shown, each of the elements of FIG. 1 include circuit elements or combinations of circuit elements in FIG. 3. Thus, the current-limiting circuit 200 may be deemed a variant In this embodiment, the transistor pass element 102 is embodied as a pass transistor 203, shown as a MOSFET, while in other embodiments, the pass transistor 203 may be a IGBT, SICFET, or cascode circuit. In one particular embodiment, the pass transistor 203 may be an enhancement mode N-FET. As shown, the pass transistor 203 is controlled at its gate or terminal in common with its source terminal. In embodiments of a BJT, the base terminal may be controlled in common with emitter terminal.

During normally-on operation of the current-limiting circuit 200, the control terminal is biased to be normally-on by a highly resistive network, composed of weak normally on circuit 109, as well as the second controller 108. As such, the action of the weak normally on circuit 109 may be readily be overcome by the action of another circuit.

In this embodiment, the second controller 108 includes a diode 210, having an anode connected to a gate of the pass transistor 203. The highly resistive network includes a resistor 206, resistor 208, and sense resistor 211, arranged as shown and providing appropriate ratios that will allow the pass transistor 203 to conduct current in the direction from terminal T1 to T2.

In accordance with this embodiment, a current-limit control circuit including the current sense element 112 and first controller 104, includes a bipolar transistor 205 (which transistor may include a gate, a collector, and an emitter), and sense resistor 211, and sense resistor 218, arranged in electrically parallel fashion, and a connection to the transistor gate of pass transistor 203.

As the magnitude of current increases through the current sense element 112 (sense resistor 211 and sense resistor 218), the resulting voltage will control the bipolar transistor 205, which transistor in-turn controls the pass transistor 203. The bipolar transistor 205 will gradually control the pass transistor 203 to become more resistive, thus limiting current through the current sense element 112.

Additionally, as the voltage across the pass transistor 203 increases due to current limiting, the third control law begins to dominate the pass transistor 203. In this embodiment, the overvoltage control circuit (106+114) includes of a voltage divider sensing element, formed from a resistor 216 and resistor 215, as well as a second control transistor, in this case, a bipolar transistor 204. Notably, in other embodiments, a different transistor type may be used for the second control transistor. The bipolar transistor 204 is configured to be able to completely turn off the pass transistor 203 when the voltage across the bipolar transistor 204 reaches a level set by the voltage divider sensing element. In this embodiment, the third controller 114 includes a resistor 212, diode 213, and capacitor 214, to provide a turn-off mechanism that is unique to this class of device. This overvoltage protection can also be viewed as an upper current limit or also a transistor protection device. Notably, the overvoltage control circuit is just active while the terminals T1 and T2 are forward biased, where T1 has greater voltage potential than T2.

In the event of a reverse bias condition, the diode 217 is arranged to protect the pass transistor 203 and control circuitry.

Figure 4:
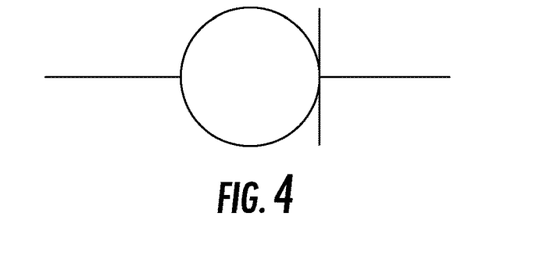
FIG. 4 presents a graphic representation of the first embodiment.

To further explain the current limiting circuit embodiments of FIGS. 3 and 4, the current limiting circuits shown therein may be characterized as providing four different current conduction paths. A first current conduction path includes the first terminal; the transistor pass element, including at least one enhancement mode n-channel FET device; a first current sense element; a first diode arrangement; and the second terminal. The second current conduction path for normally-on control, includes the first terminal; a first resistive network, coupled to the gate connection of the at least one enhancement mode n-channel FET; and the second terminal. The third current conduction path for current-limiting control, includes the first terminal; a second resistive network, coupled to a first control transistor coupled to the gate connection of the enhancement mode n-channel FET; and the second terminal. The fourth current conduction path for voltage-mode control, includes the first terminal; a third resistive network, coupled to a second control transistor coupled to the gate connection of the enhancement mode n-channel FET; and the second terminal.

From another perspective, the current limiting circuit embodiments of FIGS. 3 and 4, are arranged to generate at least four modes of operation. These modes of operation include a reverse blocking region having relatively very higher impedance; a linear region characterized by device forward biasing, below a current-limiting threshold voltage and having a rapidly decreasing impedance; a current-limiting region characterized in that an impedance is controlled by the current sense element; and a cutoff region characterized in that a voltage across the transistor pass element exceeds a voltage-mode controller threshold.

Figure 5:
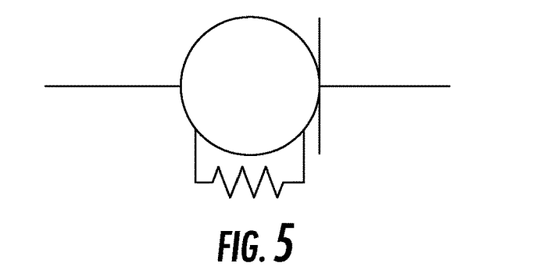
FIG. 5 presents a graphic representation of a further embodiment.

FIG. 4 shows a general representation of a current limiting diode and FIG. 5 shows a general representation of a discrete external resistor provided to program the high current trip level.

Figure 6:
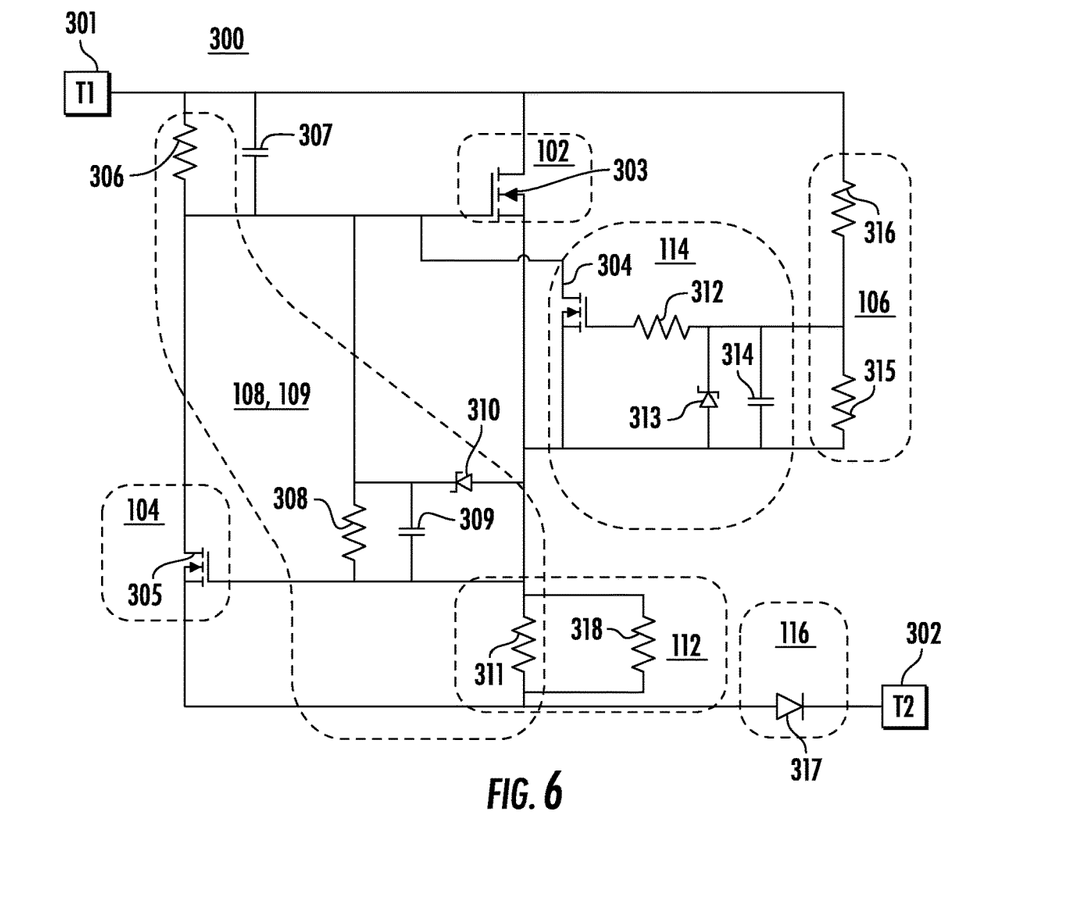
FIG. 6 presents a schematic drawing of further embodiments.

Turning to FIG. 6, there is shown a current-limiting circuit 300, arranged in accordance with additional embodiments of the disclosure. The current-limiting circuit 300 may include generally circuit elements that perform the functions of the components of current-limiting circuit 100, arranged in a similar configuration, where the elements of FIG. 1 are shown in dashed lines. As shown, each of the elements of FIG. 1 include circuit elements or combinations of circuit elements in FIG. 3. Thus, the current-limiting circuit 300 may be deemed a variant In this embodiment, the transistor pass element 102 is embodied as a pass transistor 303, shown as a MOSFET, while in other embodiments, the pass transistor 303 may be a IGBT, SICFET, or cascode circuit. As shown, the pass transistor 303 is controlled at its gate or terminal in common with its source terminal. In embodiments of a BJT, the base terminal may be controlled in common with emitter terminal.

During normally-on operation of the current-limiting circuit 300, the control terminal is biased to be normally-on by a highly resistive network, composed of weak normally on circuit 109, as well as the second controller 108. The highly resistive network includes a resistor 306, resistor 308, and resistor 311, arranged as shown and providing appropriate ratios that will allow the pass transistor 303 to conduct current in the direction from terminal T1 to T2.

In accordance with this embodiment, a current-limit control circuit including the current sense element 112 and first controller 104, includes a bipolar transistor 205, and sense resistor 211, and sense resistor 218, arranged in electrically parallel fashion, and a connection to the transistor gate of pass transistor 203.

As the magnitude of current increases through the current sense element 112 (sense resistor 211 and sense resistor 218), the resulting voltage will control the MOSFET transistor 305, which transistor in-turn controls the pass transistor 303. The MOSFET transistor 305 will gradually control the pass transistor 303 to become more resistive, thus limiting current through the current sense element 112.

Additionally, as the voltage across the pass transistor 303 increases due to current limiting, the third control law begins to dominate the pass transistor 303. In this embodiment, the overvoltage control circuit (106+114) includes of a voltage divider sensing element, formed from a resistor 316 and resistor 315, as well as a second control transistor, in this case, a MOSFET transistor 304. The MOSFET transistor 305 is configured to be able to completely turn off the pass transistor 303 when the voltage across the MOSFET transistor 305 reaches a level set by the voltage divider sensing element. In this embodiment, the third controller 114 includes a resistor 312, diode 313, and capacitor 314, to operate in the following manner. As the voltage between the drain and source terminals of pass transistor 303 rises, the resulting voltage between resistor 316 and resistor 315 rises. This voltage increase provides a control signal to MOSFET transistor 304 that will turn off the drain-source conduction of pass transistor 303 when the voltage across pass transistor 303 is above a threshold. This threshold is set by a combination of factors including the value of resistors 315, 316 and the transconductance, Gm, of MOSFET transistor 304. Notably, the overvoltage control circuit is just active while the terminals T1 and T2 are forward biased, where T1 has greater voltage potential than T2.

In the event of a reverse bias condition, the diode 317 is arranged to protect the pass transistor 303 and control circuitry.

Figure 7:
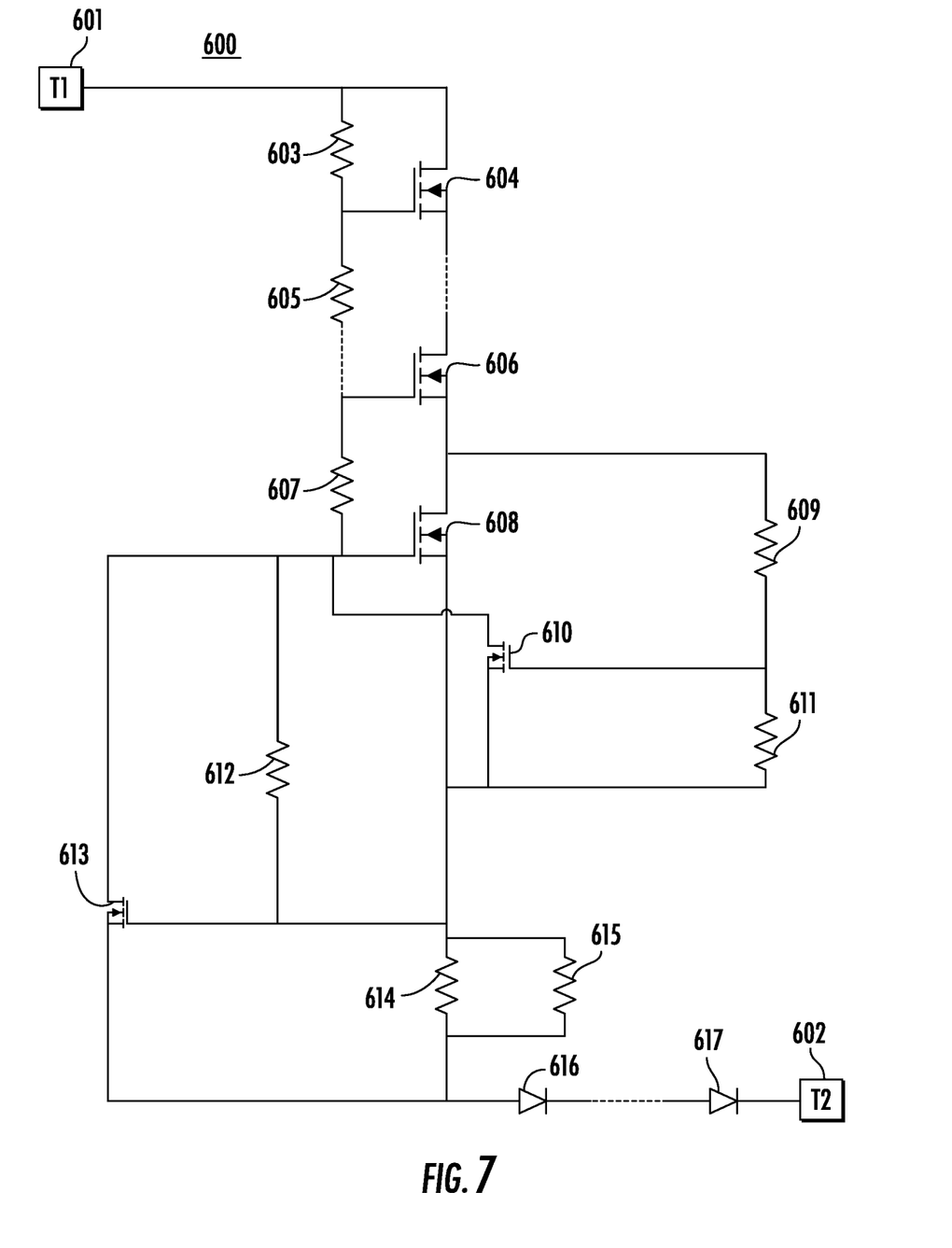
FIG. 7 presents a schematic representation of an additional embodiment.

FIG. 7 depicts a current limiting circuit 600, according to further embodiments of the disclosure. Unlike the embodiments of FIGS. 3 and 6 the current-limit control circuit includes a current pass element (embodied around a series of transistors (604, 606, 608) in a cascode relationship. During normally-on operation the control terminal of the current pass element is biased to normally-on by a highly resistive network with appropriate ratios that will allow the pass transistor to conduct current in the direction of T1 to T2. In this embodiment, the highly-resistive normally-on control circuit minimally includes resistors 603, 605, 607, 612, 614. In this embodiment, as the magnitude of current increase through the current sense network (including resistors 614, 615) a resulting voltage will control a first control transistor 613, which transistor in-turn controls the transistor pass element. The first control transistor 613 will gradually control the transistor pass element to become more resistive thus limiting current through the current sense network.

Additionally, as the voltage across the pass transistor element increases due to current limiting, the third control law begins to dominate the transistor pass element. The overvoltage control circuit in this embodiment includes resistors 609 and 611, and a second control transistor 610. The second control transistor 610 is configured to be able to completely turn off the transistor pass element when the voltage across the control transistor reaches a level set by the voltage divider sensing element. The overvoltage control circuit is configured to be active just while the terminals T1 and T2 are forward biased, where T1 has greater voltage potential than T2. In the event of a reverse bias condition, the diodes 616 and 617 are selected to protect the transistor pass element and control circuitry.

Figure 8:
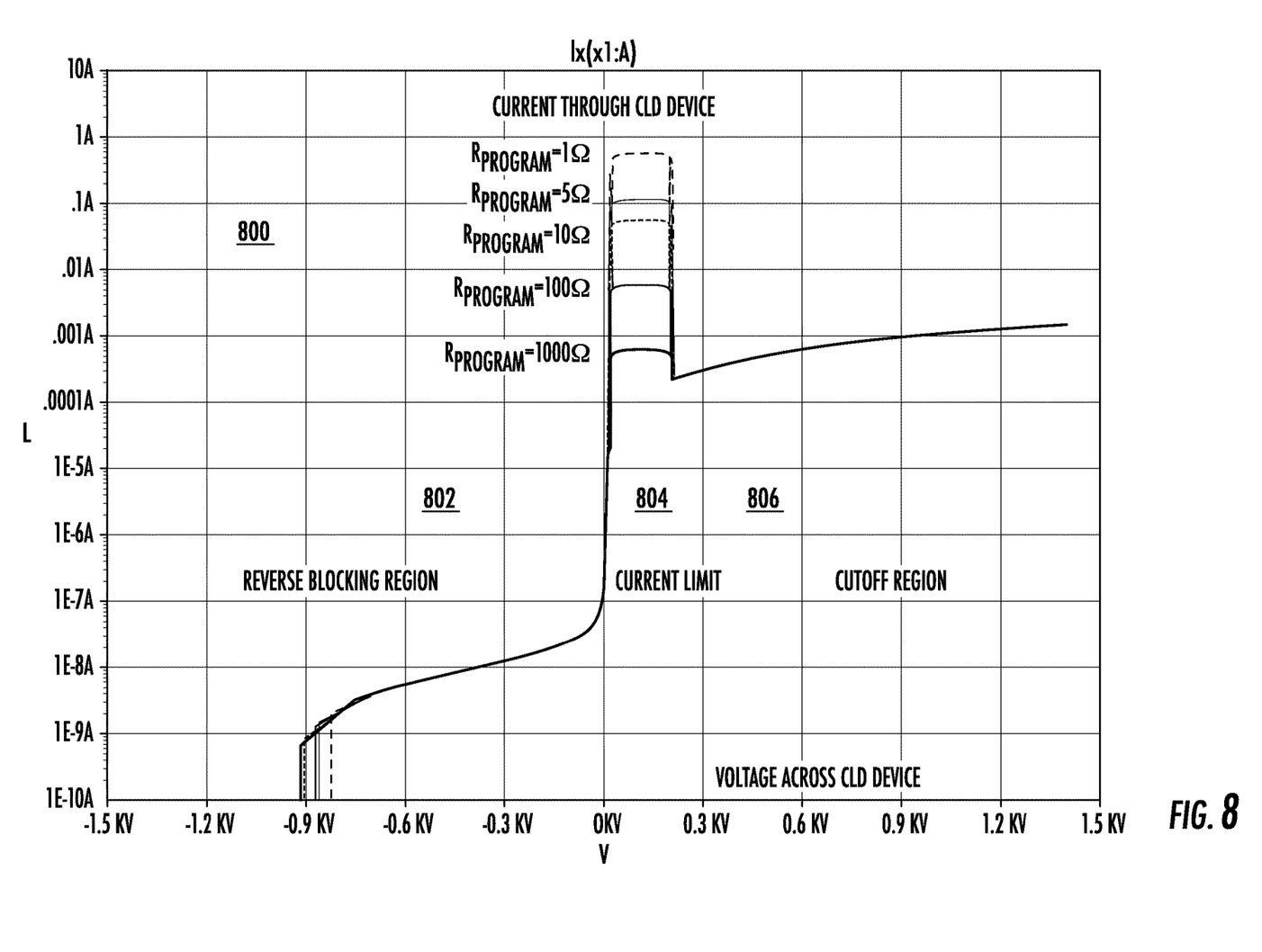
FIG. 8 presents an exemplary graph of the voltage-current operation for the present disclosure.

FIG. 8 depicts the voltage-current behavior in graph 800 form for a current limiting circuit arranged in accordance with embodiments of the disclosure. The circuit of the present embodiment exhibits three modes of behavior: reverse blocking; current limiting; and cutoff. During the reverse bias condition (negative voltage) a reverse blocking region 802 is denoted where a very small amount of leakage current is allowed through the device due to the blocking nature of the output diode and the highly resistive nature of the control circuitry. A current limiting region 804 is denoted at small positive voltage (forward bias), which voltage may be predetermined according to the application. In this example, the current limiting region 804 extends to approximately 200 V forward bias. A series of different curves are shown in the current limiting region 804 for different program resistances, ranging from 1 Ohm to 1000 Ohm, where the current values range from approximately 600 mA to 0.6 mA, respectively, where the resistances are determined by circuit 112. The graph 800 also includes a cutoff region 806, which region is the area of operation where the present embodiments may function to protect instrumentation upstream of T1. In this regime, above 200 V forward bias, a small and relatively constant current on the order of 1 mA is present.

Figure 9:
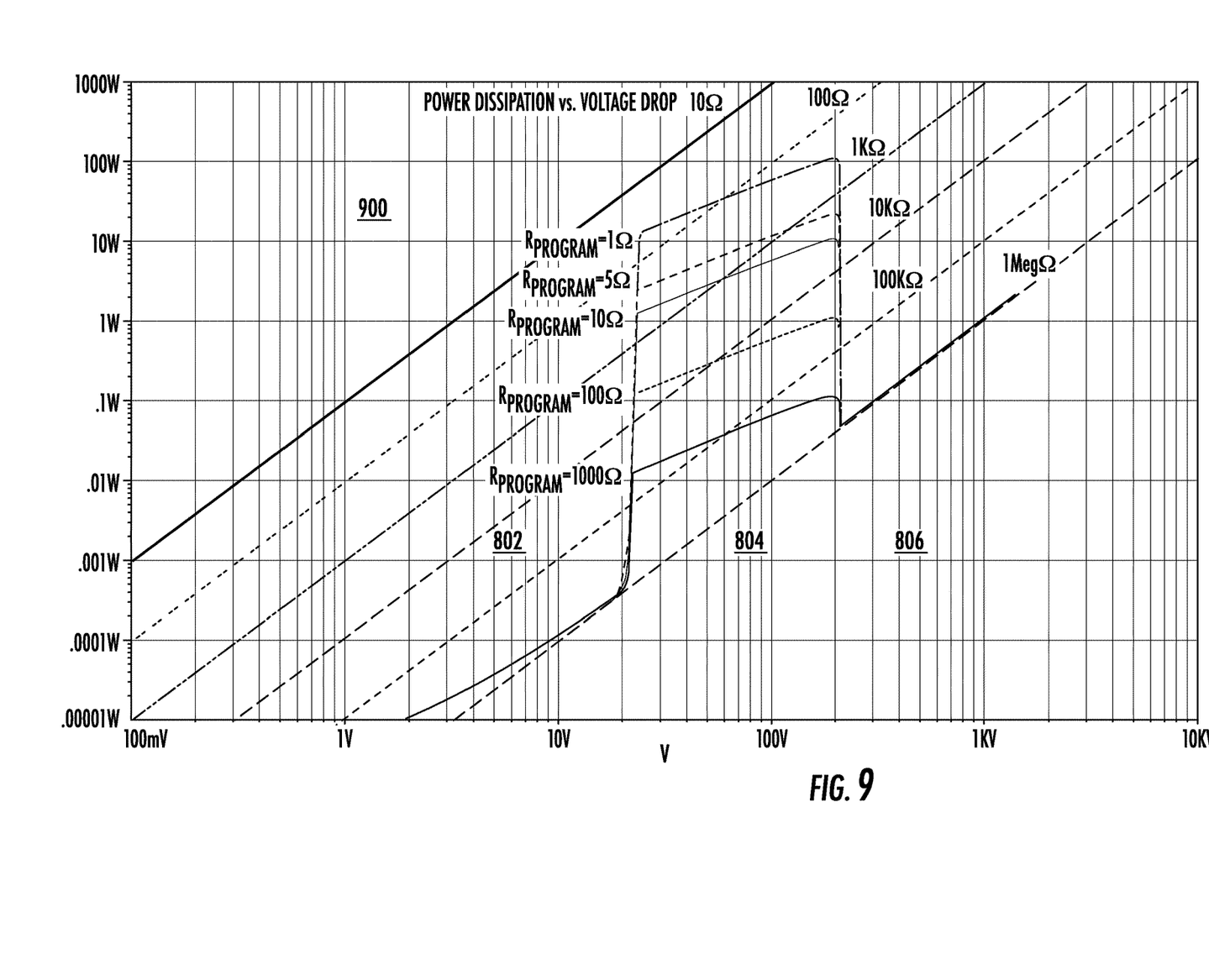
FIG. 9 presents an exemplary graph of the power dissipation and ohmic performance of the present disclosure.

FIG. 9 depicts a graph 900, depicting the power dissipation and resistance characteristics of a current limiting circuit according to the present embodiments. Each of the constant upward sloping lines represent a line of constant resistance. Power is plotted as a function of increasing voltage on a logarithmic scale. A series of straight lines (fixed slope) are shown for different constant resistance values. The lowest line represents 1 mega-ohm of resistance. In accordance with various embodiments of the disclosure, a current limiting circuit may present a 1 mega-ohm resistance, while at low forward bias voltages, as shown in the series of power curves between 2 V and 20 V that approximate the 1 M-Ohm line. The resistance then rapidly transitions of the current limiting circuits then transition to a resistance many orders of magnitude lower than the off state, depending upon the programmed resistance. As the current rises, the voltage foldback control will turn off the transistor (at approximately 200 V), restoring the resistance of all the circuits to the 1 mega-Ohm resistance line. The resistances described above are merely exemplary values and can be engineered to specific values by component selection.

Figure 10:
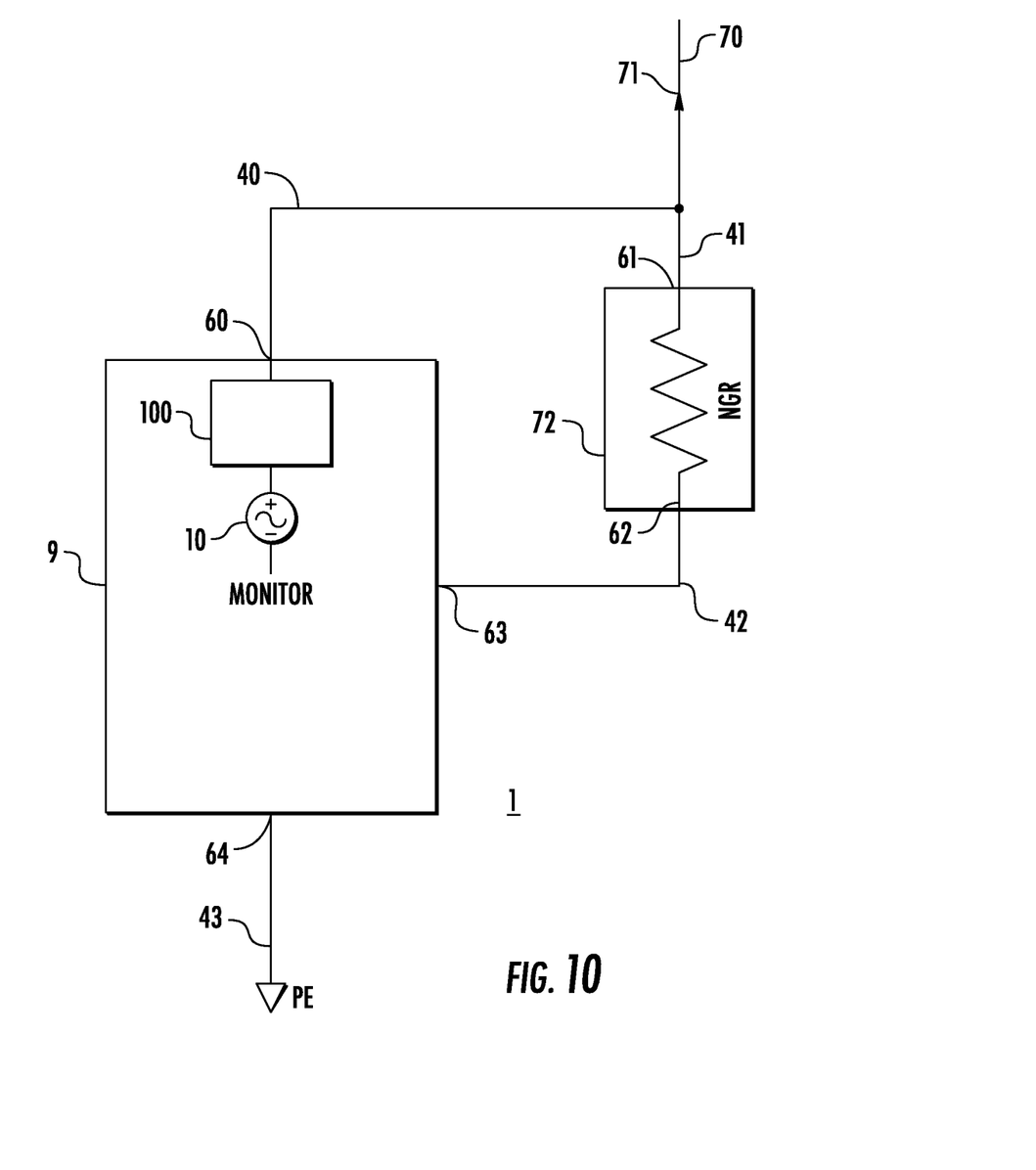
FIG. 10 depicts an embodiment of the disclosure, implemented as a fault protection arrangement.

FIG. 10 depicts an embodiment of the disclosure, implemented as a fault protection arrangement 1. The fault protection arrangement 1 includes transformer secondary 70, transformer neutralizing point 71, coupled to the a first non-ground end, shown as high-side connection point 61 of a neutral grounding resistor 72 through wire 41. A second non-ground end, shown as the low-side connection point 62 of the neutral grounding resistor 72, is coupled to the neutral grounding resistor monitor, shown as neutral grounding resistor monitor assembly 9 between low side connection point 62 and connection point 63 via coupling wire 42. A monitor assembly shown as neutral grounding resistor monitor assembly 9 provides a low-ohmic path to protective earth connecting to terminal 64 via coupling wire 43. The neutral grounding resistor monitor assembly 9 injects a signal to transformer neutralizing point 71 from connection terminal 60 via coupling wire 40. Voltages induced within neutral grounding resistor monitor assembly 9 and currents that are measured leaving connection terminal 60 and returning through terminal 63 as a result of injected signals are used to calculate the DC resistance of the neutral grounding resistor 72. The current-limiting circuit 100, is arranged in the monitor assembly between a signal generator 10, and the terminal 60. As such, the current-limiting circuit 100 provides unipolar protection for the monitor assembly 9, in conjunction with operation with the monitoring of the neutral grounding resistor 72.

While the present embodiments have been disclosed with reference to certain embodiments, numerous modifications, alterations and changes to the described embodiments are possible while not departing from the sphere and scope of the present disclosure, as defined in the appended claims. Accordingly, the present embodiments are not to be limited to the described embodiments, and may have the full scope defined by the language of the following claims, and equivalents thereof.

What is claimed is:

1. A current limiting circuit, comprising:
   a first terminal;
   a second terminal;
   a transistor pass element directly coupled to the first terminal;
   a current sense element, coupled in electrical series between the first terminal and the second terminal;
   a first controller, coupled between the current sense element and the transistor pass element;
   a diode, coupled in electrical series between the current sense element and the second terminal;
   a normally on circuit and a second controller, coupled to the transistor pass element; and
   a voltage sense element and a third controller, coupled to the transistor pass element;
   wherein the transistor pass element comprises an enhancement mode n-channel FET, wherein the current sense element comprises a pair of resistors, and wherein the first controller comprises a bipolar transistor, having a base, connected to a gate of the enhancement mode n-channel FET, and connected to the pair of resistors.

2. The current limiting circuit of claim 1, wherein the voltage sense element comprises a pair of resistors, arranged in series, and wherein the third controller comprises:
   a diode, having an anode, coupled to a connection point, the connection point lying between the pair of resistors of the current sense element;
   a capacitor, arranged parallel to the diode; and
   a bipolar transistor, having a collector, connected to the enhancement mode n-channel FET.

3. The current limiting circuit of claim 1, wherein the second controller comprises a diode, having an anode connected to a gate of the enhancement mode n-channel FET.

4. The current limiting circuit of claim 1, comprising:
   a first current conduction path, comprising:
      the first terminal;
      a transistor pass element comprising at least one enhancement mode n-channel FET device;
      a first current sense element;
      a first diode arrangement; and
      the second terminal;
   a second current conduction path for normally-on control, comprising:
      the first terminal;
      a first resistive network, coupled to the gate connection of the enhancement mode n-channel FET; and
      the second terminal;
   a third current conduction path for current-limiting control, comprising:
      the first terminal;
      a second resistive network, coupled to a first control transistor coupled to the gate connection of the enhancement mode n-channel FET; and
      the second terminal; and
   a fourth current conduction path for voltage-mode control, comprising:
      the first terminal;
      a third resistive network, coupled to a second control transistor coupled to the gate connection of the enhancement mode n-channel FET; and
      the second terminal.

5. The current limiting circuit of claim 1, wherein elements of the current limiting circuit are arranged to generate at least four modes of operation, comprising:
   a reverse blocking region having relatively very high impedance;
   a linear region characterized by device forward biasing, below a current-limiting threshold voltage and having a rapidly decreasing impedance;
   a current-limiting region characterized in that an impedance is controlled by the current sense element; and
   a cutoff region characterized in that a voltage across the transistor pass element exceeds a voltage-mode controller threshold.

6. The current limiting circuit of claim 5, the at least four modes of operation further comprising a controlled on cutoff region wherein a voltage across the transistor pass element exceeds the voltage-mode controller threshold and holds off the transistor pass element until the voltage resets below a predetermined threshold voltage, wherein a resulting impedance is greater than 1.0 Meg-ohm.

7. The current limiting circuit of claim 5, wherein the enhancement mode n-channel FET is held off by the voltage until the voltage resets below a predetermined threshold voltage where a resulting impedance is greater than 1.0 Meg-ohm.

8. The current limiting circuit of claim 5, wherein an impedances in the current limiting region has a value in a range of 1.0 ohm to 10.0 Meg-ohm.

9. The current limiting circuit of claim 5, wherein the transistor pass element is an enhancement mode n channel FET or an insulated gate bipolar transistor (IGBT) device.

10. The current limiting circuit according to claim 1, wherein a first control transistor is coupled to the current sense element in order to pass a control signal to a gate connection of the transistor pass element.

11. The current limiting circuit according to claim 1, wherein a second control transistor is coupled to a voltage sense network comprising the voltage sense element and the third controller, sensitive to a predetermined voltage level exceeding a value allowed by the first controller.

12. The current limiting circuit according to claim 1, wherein the third controller is forced to return to a relatively lower threshold voltage prior to allowing the transistor pass element to resume normal conduction.

13. The current limiting circuit according to claim 1, wherein one of the first terminal or second terminal is coupled to an output of a signal source or power source, and wherein one of the first terminal or second terminal is coupled to an input of a general-purpose data acquisition device, control device, protection relay, power supply, electrical load, or lab instrument.

14. A fault protection arrangement, comprising:
    a neutral grounding resistor comprising:
       a first non-ground end, connected to a neutralizing point, and a second non-ground end;

a neutral grounding resistance monitor assembly, directly coupled to the second non-ground end of the neutral grounding resistor; and a unipolar current limiting circuit, comprising:
- a first terminal, disposed between a current source of the neutral grounding resistance monitor assembly, and the first non-ground end of the neutral grounding resistor;
- a second terminal, coupled in electrical series between the first terminal and the first non-ground end of the neutral grounding resistor;
- a transistor pass element directly coupled to the first terminal;
- a current sense element, coupled in electrical series between the first terminal and the second terminal;
- a first controller, coupled between the current sense element and the transistor pass element;
- a diode, coupled in electrical series between the current sense element and the second terminal;
- a normally on circuit and a second controller, coupled to the transistor pass element; and
- a voltage sense element and a third controller, coupled to the transistor pass element.

15. The fault protection arrangement of claim 14, wherein the transistor pass element comprises an enhancement mode n channel FET of an IGBT.

* * * * *